FIG. 1

INVENTOR
BURTON C. COONS
BY
ATTORNEY

Patented Nov. 25, 1947

2,431,310

UNITED STATES PATENT OFFICE 2,431,310

FEEDING DEVICE FOR FRUIT PEELING MACHINES

Burton C. Coons, San Jose, Calif., assignor to Food Machinery Corporation, San Jose, Calif., a corporation of Delaware Application October 25, 1943, Serial No. 507,517

5 Claims. (Cl. 146—51)

The present invention relates to machines for handling fruit and other articles, and more specifically to means for feeding the articles to the machine.

The embodiment of the invention herein illustrated and described is designed to feed pears to a machine in which they are peeled, halved and cored, of the type disclosed in United States Patent No. 2,187,075, issued January 16, 1940, upon my application. However, the present invention may be embodied in a feed mechanism for articles other than pears, and for machines other than that herein used for illustration, and changes, within the scope of the claims hereto appended, may be made in the form, construction and arrangement of the several parts herein shown and described, without departing from the spirit of the invention as defined in said claims.

Broadly speaking, the principal object of the present invention is to provide mechanism for receiving objects, fed either manually by an operator or mechanically by a suitable conveyer, and transferring them in proper position and in properly synchronized time relation to moving holding means, by which they are advanced for subsequent treatment. The pear peeling machine of said Patent No. 2,187,075 will be used as an illustrative example in the following introductory explanation of the manner in which said principal object of the invention is achieved.

In said machine, pears are fed manually to two parallel moving receiving and transfer cups mounted on a carriage which travels back and forth, toward and away from the operator. At the forward position, the operator places one pear in each cup, stem end down. The cups then move back to their rear position at which the pears are impaled, along their stem-blossom axis, by vertically moving finned stemming tubes, and are removed from the cups by said stemming tubes and presented to the peeling mechanism. The cups thereupon move forward again to receive two more pears from the operator, and the cycle is repeated.

The time interval during which the cups are at rest in receiving position is necessarily very short, in practice about one-eighth of a second. The operator is therefore constrained to time his own motions very accurately, in order to deposit the pears in the cups within a time interval of one-eighth of a second. If he fails to synchronize his motions exactly with the movement of the receiving cups, the feed of one cycle is missed.

The carriage with the two receiving and transfer cups requires considerable time to complete the entire cycle, in practice about four seconds. Therefore, for an interval of three and seven-eighths seconds, the cups are out of receiving position. This time interval of three and seven-eighths seconds is more than necessary to enable the operator to pick up two pears, so that he is actually wasting time waiting for the cups to come into receiving position. The combination of these two factors, viz: waiting for the machine to reach the proper period in its cycle, and then having to place the pears in the receiving cups almost instantaneously, keeps the operator under a nervous strain and prevents him from moving with the most comfortable and natural rhythm. The fact that the cups are almost constantly in motion also adds to the nervous strain.

According to my present invention, I provide stationary receiving pockets positioned above the receiving positions of the moving transfer cups. The receiving pockets, fixed in position, receive the pears from the hands of the operator, and open and close automatically to permit the pears to drop into the transfer cups when they are momentarily in receiving position thereunderneath. The time of discharging the receiving pockets is very rapid, about one-twentieth of a second, so that they are almost always in condition for receiving pears from the operator, and he therefore has much more time for feeding than in the old machine where he had to feed almost instantaneously. With my new feed mechanism, the machine waits upon the operator, at least for most of its cycle, instead of the operator waiting upon the machine, as in the former case.

As a result of these improvements, viz: having the receiving pockets stationary and ready to receive the fruit for almost the entire cycle, the operator can move with a natural and comfortable rhythm, without nervous strain or fatigue, and can feed more fruit in a given time. The improvement is so great that I can employ not two transfer cups as in the old machine, but eight, arranged on two alternately moving carriages with four cups on each, and with the corresponding number of peeling, coring and halving mechanisms, so that the operator can feed four times as many pears in a given time interval to the new machine as he could to the old, with less fatigue and fewer interruptions.

The time cycle for each pear is limited to about four seconds primarily by the peeling mechanism the operation of which requires about two-thirds of the time of one complete cycle, as is well known in the art. With my improved feed mechanism, using two alternately moving carriages each having a four-second cycle, and each carrying four transfer cups cooperating with a corresponding number of feed pockets, a feed speed of two pears per second is easily achieved, i. e. each of the two carriages presents four pears in each four-second cycle to the peeling mechanism, a total of eight pears in four seconds, or two per second.

The operator picks up four pears at a time, i. e. two pears with each hand and feeds two pears at a time, one from each hand. He picks them up from a narrow transverse conveyer positioned between himself and the front of the machine, and places them in the stationary receiving pockets. There are eight pockets arranged in two side by side banks of four pockets in each bank. The operator fills first the four pockets of one bank with the four pears in his hands, then picks up four pears and feeds the four pockets of the other bank, then again feeds four pears to the first bank, and subsequently four pears to the second bank and so on. By moving with a natural and even rhythm, he can easily feed two pears each second without fatigue. The four pockets of one bank open simultaneously to drop their pears into the four transfer cups of one carriage positioned momentarily beneath, then after an interval of two seconds, the four pockets of the other bank open to drop their pears into the positioned four transfer cups of the other carriage. Thus while the operator is filling the receiving pockets of one bank, the pockets of the other bank are opened for discharge. Because the discharge requires less time than the manual feeding operation (one-twentieth of a second for discharge compared with two seconds for feeding), the operator has plenty of time and can easily speed up or slow down his motions, without abruptly breaking his rhythm, if he finds himself running either ahead of or behind the machine. It is obvious that a suitable mechanical conveyor can be substituted for the operator, to place the pears in the receiving pockets, and that other articles besides pears can be handled by the feed mechanism with or without modification.

It is obviously important that the pears be accurately positioned in the transfer cups, with their stem ends down and their stem-blossom axes vertical, so that they will be presented to the stemming tubes in proper position. It is an object of the present invention to provide means associated with the transfer cups for aligning and holding the pears in proper position, and to form the receiving pockets in such a manner that they will drop the pears into the transfer cups quickly and without change in the vertical alignment of their stem-blossom axes. Pears are articles of approximately conical form, the apex being the stem end and the base being the blossom end. The receiving pockets, as described hereinafter, therefore have approximately conical form, with their apices at the bottom, and are constructed in such a manner that when they open the pears drop quickly and accurately, without change in vertical alignment, into the transfer cups beneath.

In the light of the foregoing introductory explanation, the following corollary objects and advantages of the invention will be apparent:

To provide a feed mechanism for feeding articles to movable receiving and holding means of an article handling machine substantially instantaneously at a predetermined position of said receiving and holding means;

To provide a feed mechanism for positioning pears in a predetermined manner relative to movable pear receiving and holding means of a pear handling machine and for depositing the pears in said position into the pear receiving and holding means substantially instantaneously at a predetermined position in the movement thereof;

To provide a feed mechanism for arranging pears with their stem blossom axis in a predetermined position and for substantially instantaneously discharging the pears at a predetermined moment therefrom;

To provide a feed mechanism for holding articles in a predetermined feeding position and for substantially instantaneously discharging said articles at a predetermined moment therefrom;

To provide a feed mechanism for receiving and aligning articles in a predetermined manner, and for discharging the same substantially instantaneously therefrom without changing the alignment thereof;

To provide a stationary feed mechanism for receiving and arranging articles in a predetermined position and for substantially instantaneously dropping said articles in said position into movable holding means when the same are momentarily in alignment therewith;

To provide a feed mechanism having alternately operable groups of article supports for receiving and aligning the objects therein and for substantially instantaneously releasing the aligned articles of each group at a predetermined moment in the operation thereof;

To provide a feed mechanism for article handling machines for receiving the articles during substantially the entire cycle of operation thereof and for discharging said articles therefrom substantially instantaneously at a predetermined moment during the operation thereof;

To provide a simple and inexpensive feed mechanism for fruit handling machines which enables the operator to feed a machine of large fruit capacity in a very efficient manner.

The machine herein illustrated and specifically described hereinafter is designed for peeling, coring and halving pears, and is similar in general principles to the disclosure of my United States Patent No. 2,187,075. The peeling, coring and halving mechanism forms no part of the present invention, and has been omitted from the drawings for the sake of clearness. My improved feed mechanism, which forms the principal subject matter of this application, is shown in detail in the accompanying drawings, wherein.

Figure 1:
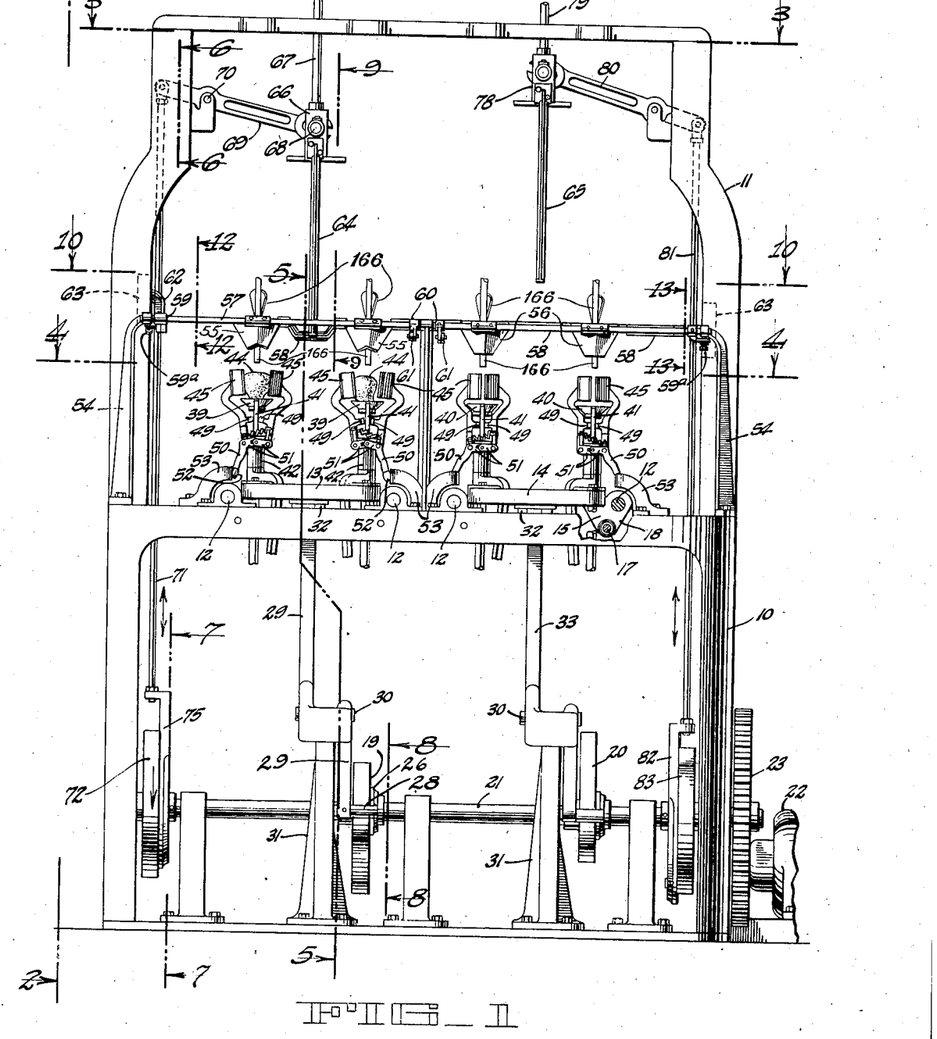
Fig. 1 of the drawings is a part sectional front elevation of a pear processing machine equipped with my improved feed mechanism, the housing and certain interior parts being omitted.
Figure 2:
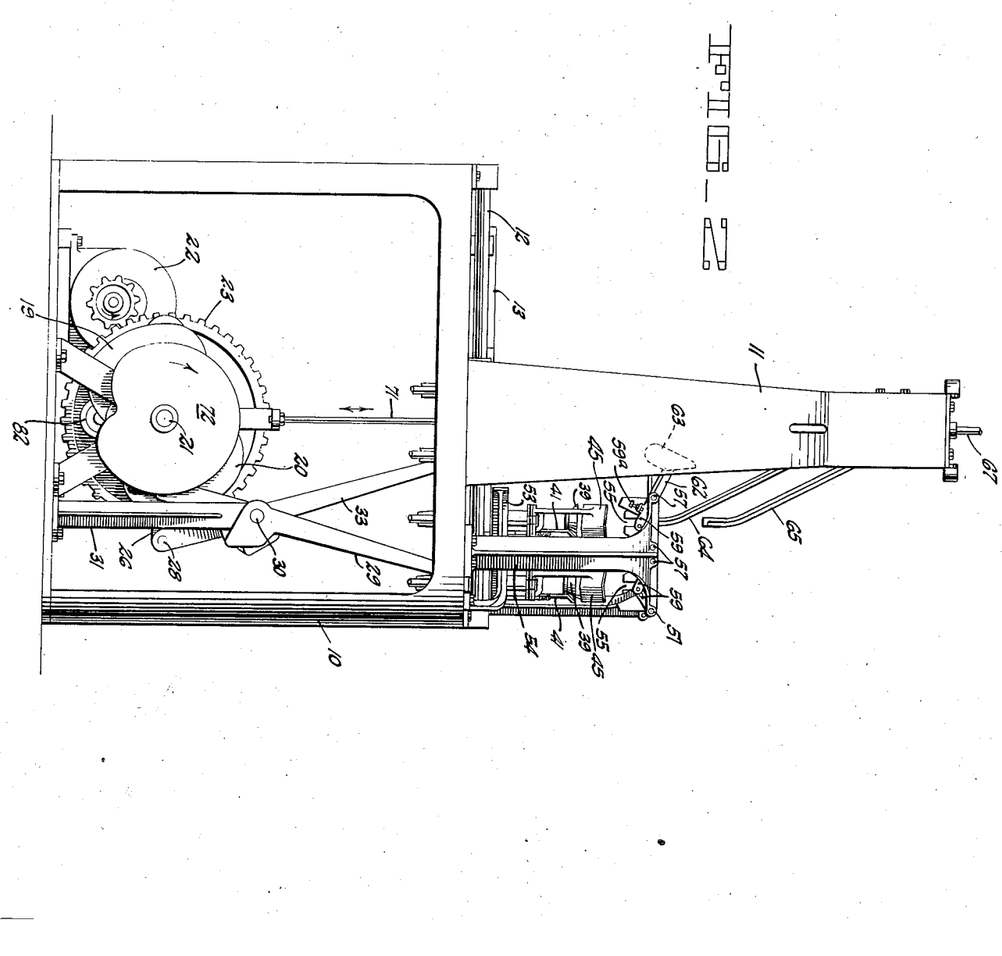
Fig. 2 is a side elevation as viewed from the left of Fig. 1, the housing and certain interior parts being omitted.
Figure 3:
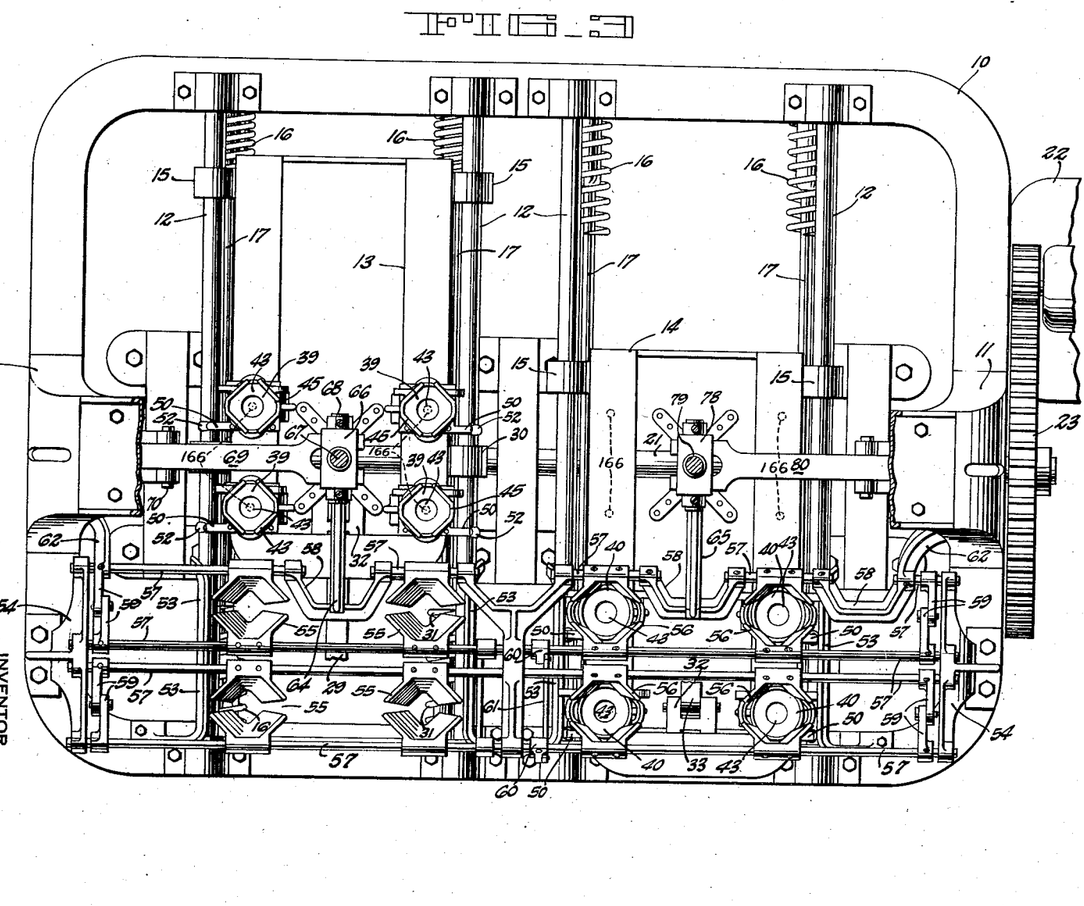
Fig. 3 is a horizontal section on the line 3—3 of Fig. 1 drawn to an enlarged scale.
Figure 4:
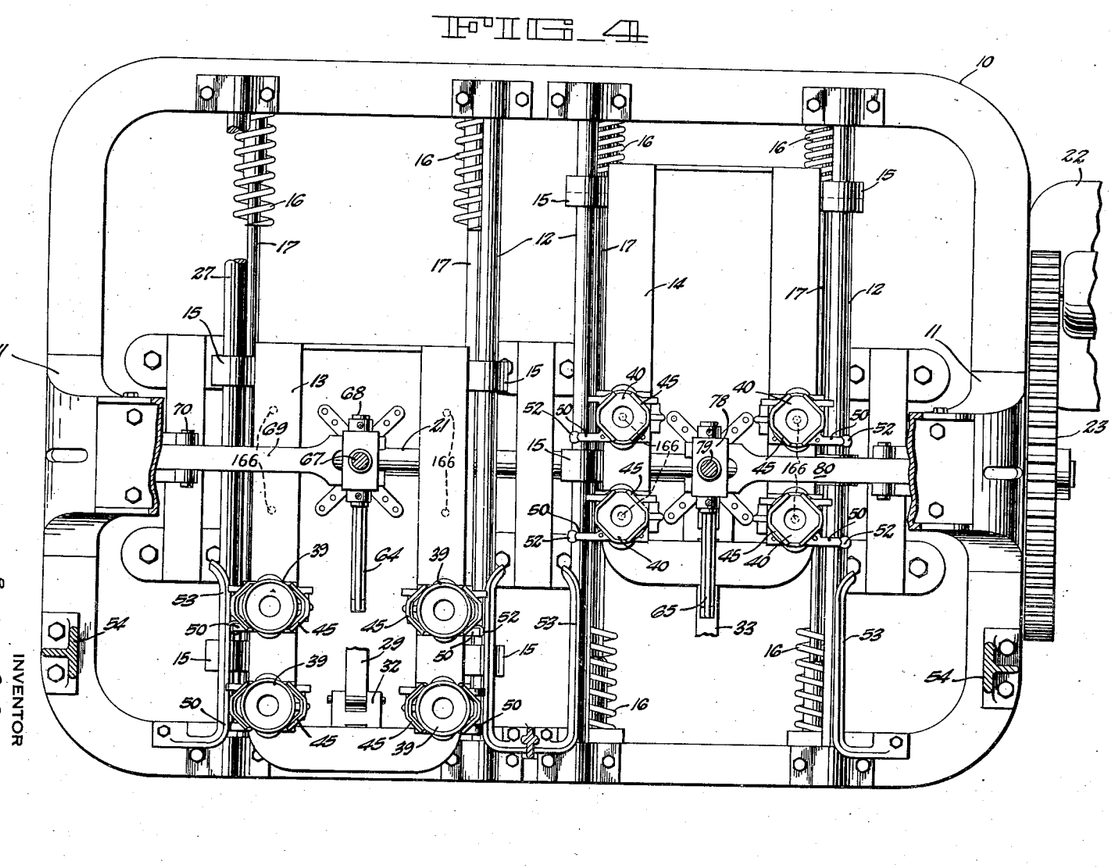
Fig. 4 is a correspondingly enlarged horizontal section on the line 4—4 of Fig. 1, certain parts being broken away, and the carriages being shown in positions respectively opposite to the positions of Fig. 3.

The reference numeral 10, Figs. 1 and 2, designates a substantially rectangular bed frame, and 11 is a superstructure frame thereon. On top of the bed frame 10 are four stationary horizontal guide rods 12 extending from front to rear. Two carriages 13 and 14, Fig. 4, are supported upon said rods for reciprocating fore and aft movement in opposite time sequence. Fig. 4 shows carriage 13 in forward position and carriage 14 in rear position. Fig. 3 shows them reversed. Each carriage comprises a rectangular frame having lugs 15 which slide upon the rods 12. Buffer springs 16 are positioned to cushion the carriages at the forward and rear limits of their movements. The buffer springs surround the ends of stationary rods 17, positioned below and parallel with the guide rods 12, and the carriages have ears which surround and slide upon said rods 17 and contact said springs at the ends of the carriage movement. One of said ears is shown at 18 in Fig. 1.

Figure 5:
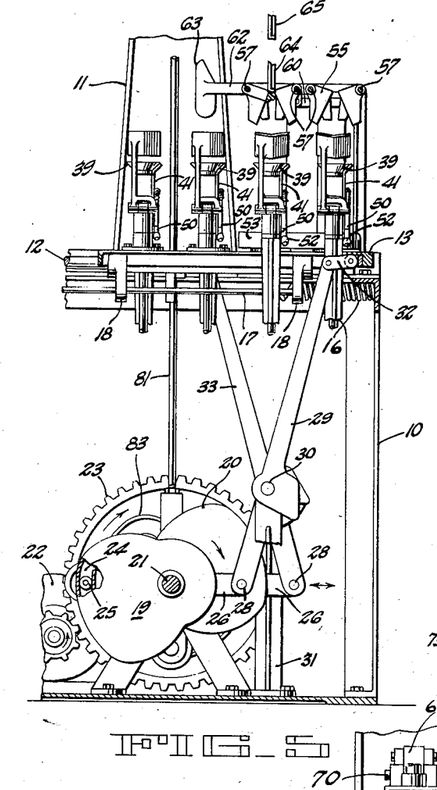
Fig. 5 is a vertical longitudinal section of a portion of the machine on the line 5—5 of Fig. 1.
Figure 8:
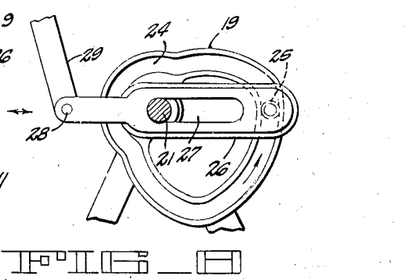
Fig. 8 is a sectional detail of the cam for operating one of the carriages, taken on the line 8—8 of Fig. 1 and enlarged.

The carriages 13 and 14 are moved forward and back by respective cams 19 and 20, Fig. 1, mounted upon a continuously rotating horizontal drive shaft 21 in the lower part of the frame. A motor 22 drives said shaft through gearing 23. The two cams 19 and 20 are identical in size and profile, but are set 180° apart on the shaft 21. The cam 19 is shown in detail in Fig. 8. It has a groove 24 in which rides a follower roller 25 mounted on a slotted slide 26, the slot 27 thereof riding upon and being guided by the shaft 21. The forward end of the slide 26 is pivoted at 28 to a lever 29. The lever 29, Figs. 1, 2 and 5, has a fulcrum at 30 on a fixed bracket 31, and its upper end is connected with the carriage 13 by a link 32, shown only in Figs. 1, 3, 4 and 5. The other carriage 14 is similarly but oppositely moved by the cam 20 through a lever 33, Figs. 1 and 2. Connections between cam 20 and lever 33, and between lever 33 and carriage 14, are similar to those described above in connection with cam 19, lever 29, and carriage 13.

Figures 15, 16:
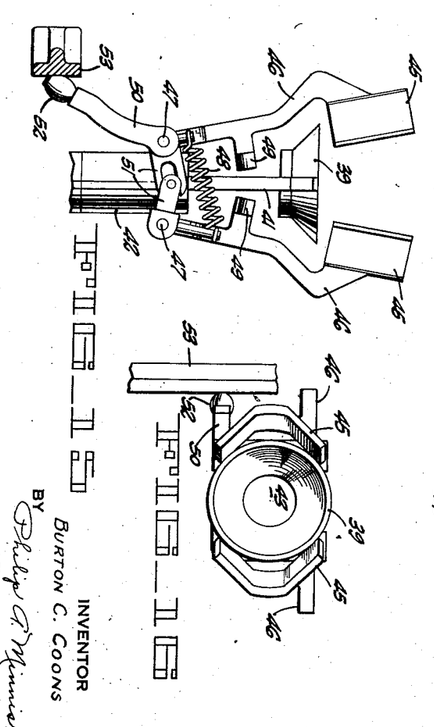
Fig. 15 is an enlarged front view, partly in section, of one of the transfer cups.
Fig. 16 is a top plan view of Fig. 15.

Near the front of each carriage are four fruit transferring and holding cups. The cups of carriage 13 are designated 39, and the cups of carriage 14 are designated 40. Each cup and its associated mechanism is identical with all the others, so a description of one will suffice for all. Figs. 1, 2 and 4 show the positions of all the cups, and Figs. 15 and 16 show details of construction of one cup.

The cup 39 is supported by a bracket 41 rising from a pedestal 42 upon the carriage. The cup is in the form of a truncated cone, with a central hole 43. The pear rests in the cup with its stem end down, as shown at 44 in Fig. 1. Above the cup are two opposite swinging clamps 45 carried by arms 46 pivoted at 47 to the pedestal 42. The clamps, when closed, embrace the upper portion of the pear and align and hold it with its stem-blossom axis vertical and aligned with the center of the cup. A spring 48 closes the clamps, and stops 49 limit their closing movement to prevent contact with the cup 39 when the pocket is empty. The clamps 45 are opened by an arm 50 secured to the pivot 47 of one clamp, and a pair of toggle levers 51 having a slot and pin connection, as clearly shown in Fig. 15. The arm 50 has a roller 52 which rides upon a stationary cam 53 as the carriage moves to its forward position. The position and profile of the cam 53 is shown in Figs. 1, 3 and 4. When the carriage moves forward, the cam moves the arm 50 inwardly and opens the clamps 45, so that the pear can drop freely into the cup; then when the carriage moves rearward, the arm rides off the cam and the clamps are closed upon the pear by the spring 48.

When the carriage comes to rest at its rear position, the four pears, seated in the four cups 39 and held in vertical alignment by the clamps 45, are impaled from above and removed from the cups by vertically movable stemming tubes 166 shown schematically in Figs. 3 and 4 after the manner disclosed in my Patent No. 2,187,075. The peeling, coring and halving mechanism which acts upon the pears after their removal from the cups by the impaling tubes 166, form no part of the present invention and are not shown in the drawings herein. It is important to bear in mind, however, that the pears must be presented to the impaling tubes with their stem-blossom axes vertical and accurately located in line with the centers of the cups, and that one of the purposes of the feeding mechanism herein described is to place and hold the pears in such position.

The mechanism for receiving the fruit from the operator (or from a suitable mechanical conveyer, as the case may be) will now be described.

Figure 10:
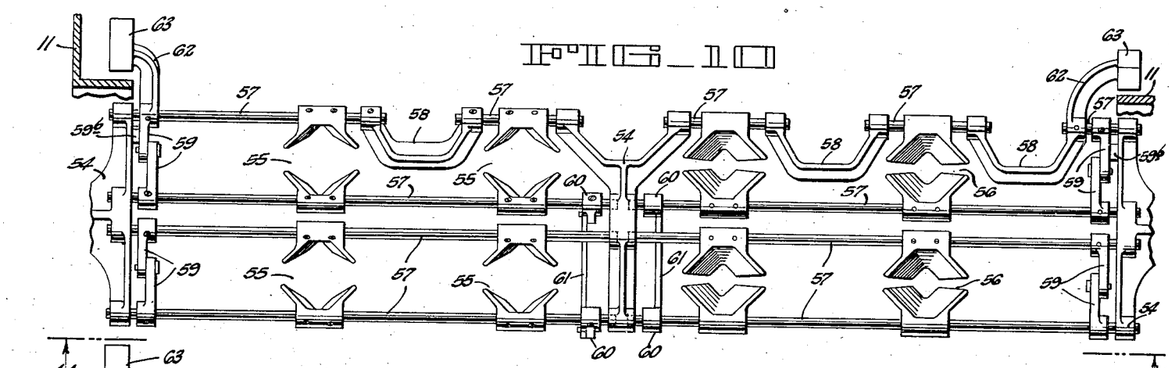
Fig. 10 is a horizontal section taken on the line 10—10 of Fig. 1 and enlarged, showing the receiving pockets and their mounting and operating mechanism.
Figures 11, 12, 14:
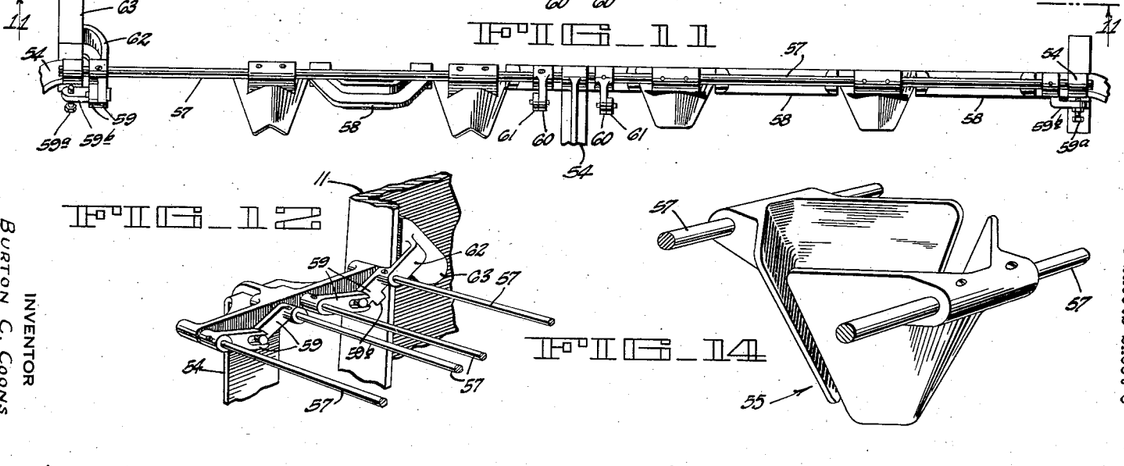
Fig. 11 is a front elevation of the same.
Fig. 12 is an enlarged perspective section of the left end of the receiving pocket mounting and operating mechanism.
Fig. 14 is an enlarged perspective of one of the receiving pockets, the mounting rods being shown in section.

Two side by side banks, of four receiving pockets each, are supported by brackets 54 rising from the main frame 10 in front of the superstructure 11 (Figs. 1, 2 and 3). The four pockets of each bank are directly above the four transfer cups of the corresponding carriage below, when said carriage is at its forward rest position. The pockets of the left hand bank are designated 55, and the pockets of the right hand bank are designated 56. The two banks of pockets are identical, so that a description of one will suffice. Figs. 10, 11 and 14 show details of construction.

Figure 13:
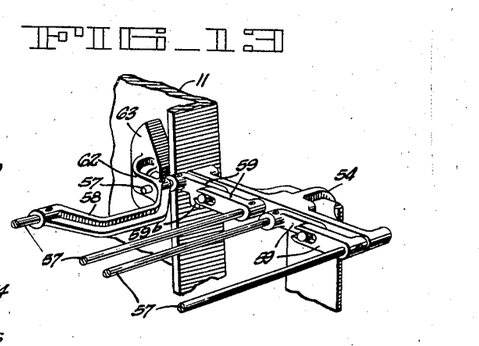
Fig. 13 is an enlarged perspective section of the right hand end of the receiving pocket mounting and operating mechanism.

Each receiving pocket is formed of two complementary half wall sections which, when closed as shown at the right of Fig. 10 and in Fig. 14, form an approximately conical pocket adapted to receive and hold a pear with its stem end down and its longitudinal axis coincident with the longitudinal axis of the pocket. The half pocket sections are affixed to and supported by horizontal transverse rods 57 arranged in the manner clearly shown in Fig. 10 and journaled for rocking movement in the brackets 54. There are four such rods 57 for each bank of pockets. The foremost rod carries the front halves of the two front pockets of the bank, the second rod carries the rear halves of said two front pockets, the third rod carries the front halves of the two rear pockets, and the fourth or rearmost rod carries the rear halves of said two rear pockets. The rear rod is provided with offset sections 58 for a purpose to be explained later. The rods of one bank of pockets are separate from the rods of the other bank, because the two banks operate alternately. The four rods of each bank are interconnected, however, for simultaneous rocking movement. Slot-and-pin connected toggle levers 59, Figs. 10, 12 and 13, at the outer ends, connect the two forward rods together and likewise connect the two rear rods together. Levers 60 and links 61, at the inner ends, connect the first and third rods together.

As will be seen from the above description, and from Figs. 10 and 12, the first and second rods rock in opposite directions to open and close the forward pockets, and similarly the third and fourth rods rock in opposite directions co-incidentally with the first and second rods to open and close the rear pockets. Thus the pivoted wall sections of all four pockets of one bank open and close simultaneously. In Fig. 10 the pockets 55 of the left hand bank are open and the pockets 56 of the right hand bank are closed.

Figure 9:
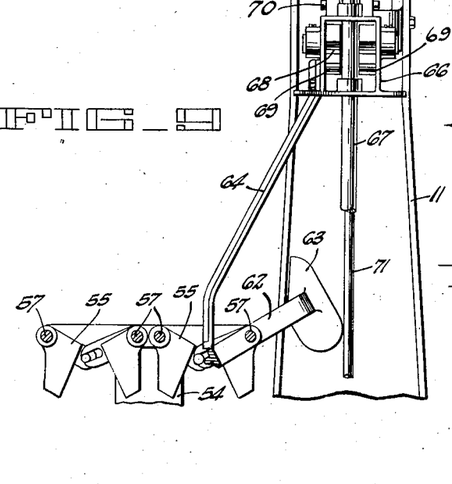
Fig. 9 is an enlarged vertical section of a portion of the mechanism for operating the receiving pockets, taken on the line 9—9 of Fig. 1.

At the outer ends of the rearmost rods 57 are rearwardly extending arms 62, having weights 63 at their ends, which close the pockets. An adjustable stop 59ª carried by a lateral extension 59ᵇ on one of the toggle levers 59 of each bank and engaging the bracket 54 adjacent thereof limits the closing movement of the pockets, as shown in Figs. 10 and 11. The pockets are opened by vertically moving push rods which bear down upon the offset sections 58 of the rear rocking rod 57, said offset sections acting as levers. The push rods, designated 64 and 65, are shown in Figs. 1, 2 and 9. One of them operates each bank of pockets, and both are identical, so that a description of one will suffice.

Figure 6:
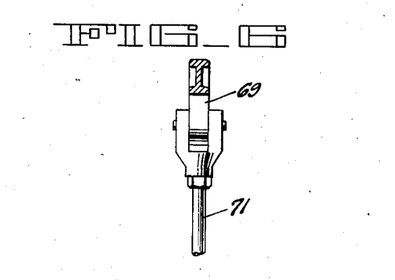
Fig. 6 is a sectional detail, enlarged, on the line 6—6 of Fig. 1.
Figure 7:
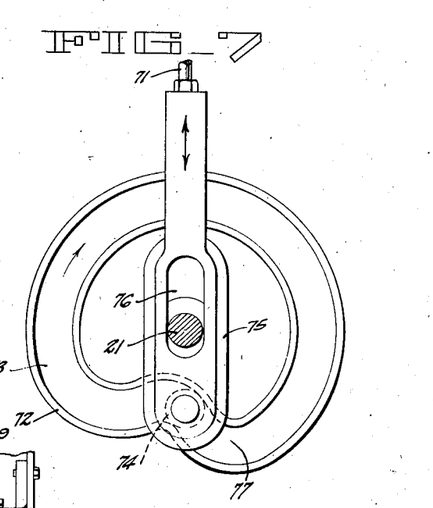
Fig. 7 is a sectional detail of the cam for operating the receiving pockets, taken on the line 7—7 of Fig. 1 and enlarged.

The push rod 64, operating the left hand bank of pockets 55, is secured to a cross head 66 (Figs. 1 and 9) mounted upon a vertical rod 67 which has suitable guides in the superstructure. Studs 68 project inwardly from the sides of the cross head toward the rod 67, and are engaged by a double forked lever 69 having a fulcrum at 70. The inner end of the lever is slotted both vertically to straddle the rod 67 and horizontally to engage the studs 68. The outer end of the lever 69 is connected with a long rod 71 (Figs. 1, 2 and 6) which extends down to the base of the machine, and is operated by a cam 72 on the drive shaft 21. Fig. 7 shows the profile of the cam 72 and the connection between it and the rod 71. A groove 73 is formed in the face of the cam, in which rides a follower roller 74 mounted upon a slide 75 secured to the rod 71. A slot 76 in the slide rides upon the drive shaft 21 and acts as a guide. The cam groove 73 is concentric for most of its circumference, and has a steep declivity 77 at one point, which causes the pockets 55 and 56 to remain closed for most of the cycle, but to open and close quickly during a small portion of said cycle.

The push rod 65, operating the right hand bank of pockets 56, is actuated in similar manner by a cross head 78, a guide rod 79, a forked lever 80, a connecting rod 81, a slide 82, and a cam 83, all clearly shown at the right hand side of Fig. 1. The cams 72 and 83 are similar in profile but are set 180 degrees apart on the shaft 21, so that the two banks of pockets 55 and 56 are opened alternately.

It is important to note that the halves or sections of the receiving pockets 55 (and 56) are mounted below and extend downwardly from their supporting and operating rocking rods 57 (see Figs. 10 and 14). Thus when the pockets are suddenly opened and closed in snap-like action by the steep portion of the cam, the side portions of opposing halves of the pockets which engage the fruit are quickly moved downwardly and away from each other so that the pears resting within them are freed completely, are dropped without rubbing against the sides of the pocket and hence without changing the position or alignment of their stem-blossom axes. Therefore, the receiving pockets, by their shape, position the pears correctly in the first place, i. e. with their stem-blossom axes vertical, and then completely and instantaneously release them for free gravitation into the lower transfer cups in the same correct position so that the stem ends of the pears enter the cups 39 or 40, respectively. They are then held in that position by the clamps 45, or if the pears tilt after they have been received with their stem ends in the cups 39 or 40 they are properly aligned again by the clamps 45 in a manner well known in the art. Thereupon the properly aligned pears are transferred to the impaling tubes (not shown) for subsequent presentation to the peeling, coring and halving mechanism (also not shown).

The operation of the machine will now be reviewed with reference to the diagrams of Figs. 17 to 25 inclusive. These diagrams indicate, in plan, the receiving pockets and the transfer cups, and illustrate successive stages in the process of feeding and transferring the pears. The complementary angular lines 55 and 56 indicate the receiving pockets, the complementary semicircles 39 and 40 indicate the transfer cups, and the stippled circles 44 indicate the pears.

Figure 17:
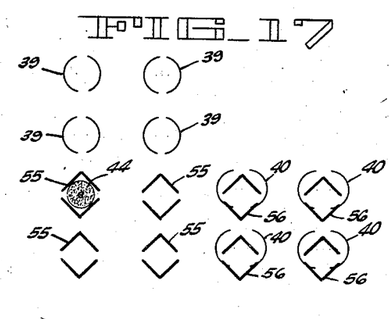
Figs. 17 to 25 inclusive are plan diagrams illustrating the successive positions of the transfer cups, receiving pockets, and the fruit as it passes through the complete feed cycle.
Figure 18:
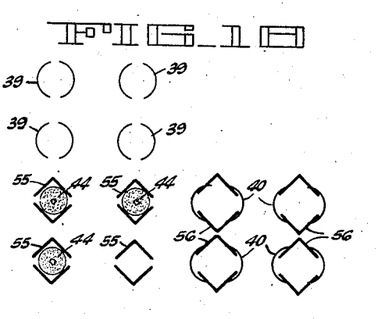
Figure 19:
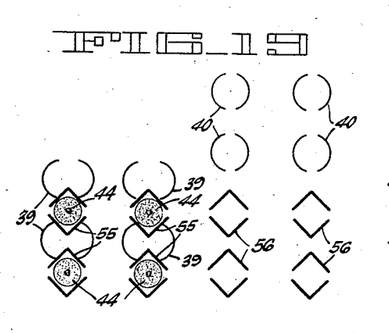
Figure 20:
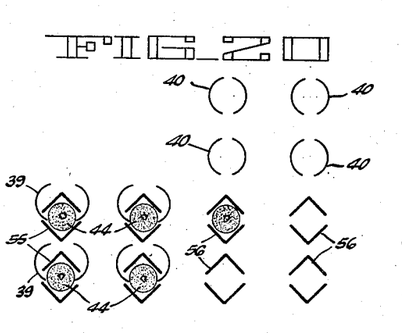
Figure 21:
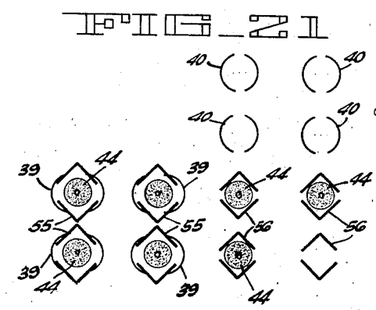
Figure 22:
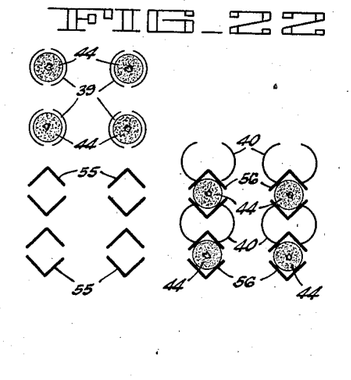

Starting the cycle, as in Fig. 17, with the left hand transfer cups 39 in rear position, the right hand transfer cups 40 approaching their forward position, and the receiving pockets 55 and 56 of both banks closed, the operator begins to place pears in the receiving pockets 55 of the left hand bank. One pear 44 has been so placed. In Fig. 18, two more pears have been placed in the left hand bank of pockets; the right hand bank of pockets 56 have opened and the right hand transfer cups (with their clamps open) are in position beneath. However, since the pockets 56 are empty no feeding at the right hand bank takes place. In Fig. 19 all four pockets 55 of the left hand bank have been filled with pears and the left hand transfer cups are moving forward to receive said pears; the transfer cups 40 have moved to rear position and the pockets 56 of the right hand bank have closed and are ready to receive pears. In Fig. 20, the operator has begun to place pears in the right hand pockets 56 and the transfer cups 39 approach their forward position. In Fig. 21 he continues filling the right hand pockets, while the transfer cups 39 have reached their forward position and the left hand pockets 55 have opened and dropped their pears into the positioned transfer cups (with open clamps) therebeneath. In Fig. 22 all four pockets 56 of the right hand bank have been filled with pears and the cups 40 are moving toward their forward position. The left hand transfer cups (with clamps closed) have moved back into position for transfer of the pears to the impaling tubes; the left hand pockets 55 have again closed and are ready to again receive pears.

Figure 23:
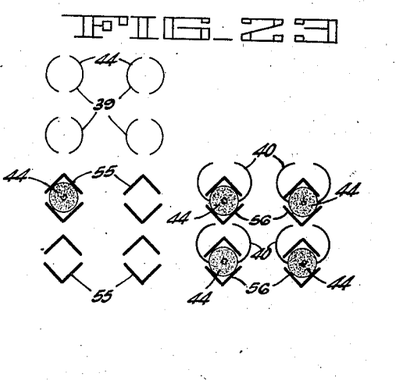
Figure 24:
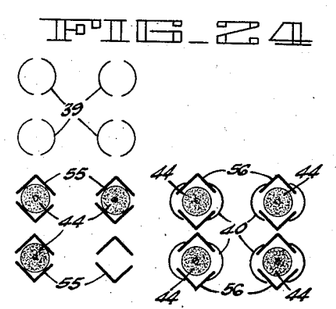
Figure 25:
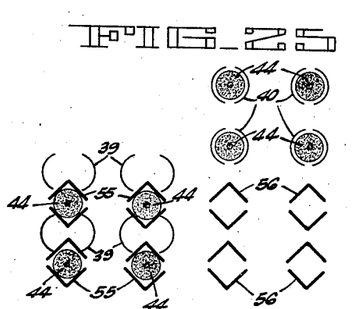

Fig. 23 begins the second cycle. The pears in the cups 39 (Fig. 22) have been impaled and removed. All pockets 55 and 56 are closed. One pear has been placed in the left hand pockets 55 and the right hand transfer cups 40 are moving up (with open clamps) to receive the pears from the right hand pockets 56. In Fig. 24, the right hand pockets 56 have opened to drop their pears into the right hand transfer cups 40 positioned beneath (with clamps open); the operator continues to place pears in the left hand pockets 55 and cups 39 are in their rear position. In Fig. 25 the right hand transfer cups 40 have moved back (with clamps closed) to position for the transfer of their pears to the impaling tubes; the right hand pockets 56 have again closed and are ready to receive pears; and the left hand pockets 55 have all been filled with pears and are ready to drop them into the left hand transfer cups 39 which are moving to the forward position.

Fig. 25 corresponds to Fig. 19, previously referred to, with the exception that the cups 40 are filled with pears in Fig. 25. After the pears in cups 40 (Fig. 25) have been impaled and removed from the cups 40 by the stemming tubes, the cycle of operations continues as shown in Fig. 20 and repeats as herein described and shown in Figs. 20 to 25 during the further operation of the machine.

It will therefore be seen that in feeding the machine the operator first picks up four pears, two with each hand, and feeds the four pockets of the left hand bank. Thereupon the operator picks up four pears, two with each hand, and feeds the four pockets of the right hand bank. The next four pears are then fed to the pockets of the left hand bank and so on. In this way the operator can perform the feeding in a certain natural rhythm without nervous strain since, as above specifically explained, the fruit receiving pockets are practically always in receiving position. It is only necessary that the operator maintains a certain speed so that his feeding does neither lag behind the opening and closing of the feed pockets of the banks nor runs ahead of the discharge of the pears already fed into the pockets of the machine. The feed limits established by the operation of the machine are of comparatively wide range enabling the operator to adjust his motions within said range as desired with the speed of the machine.

If the operator desires he may pick up only two pears, one with each hand at a time, and perform this operation twice to feed the left or right hand bank of the machine and he may also feed the pockets of each blank in any desired order.

On the other hand, if it is possible to operate the machine at a speed which exceeds the feeding speed of one operator, two operators, one for each bank may be employed. In any event, i. e., irrespective of the mode of feeding and the number of operators employed, the feed mechanism of the present invention materially increases the feeding ability of the operator, eliminates the nervous strain on the operator and permits him to feed the machine with a natural and comfortable rhythm.

Having thus described my invention and in what manner the same may be used what I claim as new and desire to protect by Letters Patent is:

1. The combination with a pear treating machine including an intermittently operated impaling member for engaging an oriented pear and carrying it into the machine, means for feeding the pear into position to be engaged by said member comprising a movable cup shaped to engage and support a pear in a predetermined position, means mounting said cup for movement from a fixed feed position to a position in alignment with the impailing member, means for moving the cup from the feed position into alignment with the impaling member, means for placing the pear into the cup at said fixed feed position including a normally closed pocket into which the pear is fed with its longitudinal axis coincident with the longitudinal axis of the pocket, mounting means for supporting the pocket bodily in fixed position, said pocket including pivoted pear retaining sections for receiving the pear and members connected therewith for pivotally moving said sections to release and drop the pear into the cup, means for opening the pocket in timed relation to the movement of the cup, and means for closing said pocket, the association, arrangement and timing of the described elements being such that the pocket remains closed during the major portion of the cycle of movement of the cup to permit a time interval wherein to feed the pears to the bodily fixed pocket.

2. The combination with a pear treating machine including an intermittently operated impaling member for engaging an oriented pear and carrying it into the machine, means for feeding the pear into position to be engaged by said member comprising a movable cup shaped to engage and support a pear by its bulbous portion nearest the stem end, means mounting said cup for movement from a fixed feed position to a position in alignment with the impaling member, means for placing the pear into the cup stem end first at said fixed feed position including a normally closed pocket into which the pear is fed manually with its longitudinal axis coincident with the longitudinal axis of the pocket, mounting means for supporting the pocket bodily in fixed position, said pocket including pivoted pear retaining sections for receiving the pear and members connected therewith for pivotally moving said sections to release and drop the pear into the cup, means operatively connected to the cup operating means to engage said members to open the pocket, and means connected with said members to close the pocket, the association, arrangement and timing of the described elements being such that the pocket remains closed during the major portion of the cycle of movement of the cup to permit relatively leisurely manual feed of pears to the bodily fixed pocket.

3. The combination with a pear treating machine including an intermittently operated impaling member for engaging an oriented pear and carrying it into the machine, means for feeding the pear into position to be engaged by said member comprising a movable cup shaped to engage and support a pear by its bulbous portion nearest the stem end, means mounting said cup for reciprocation from a fixed feed position to a position in alignment with the impaling member, means for placing the pear into the cup stem end first at said fixed feed position, said pear placing means including a pocket into which the pear is deposited with its longitudinal axis coincident with the longitudinal axis of the pocket, mounting means for supporting the pocket in bodily fixed position, said pocket including pivoted pear retaining sections for receiving the pear and members connected therewith for pivotally moving said sections to release and drop the pear into the cup, means operatively connected to the cup reciprocating means to engage said members to open the pocket, and means connected with said members to close the pocket, the association, arrangement and timing of the described elements being such that the pocket remains closed during the major portion of the cycle of movement of the cup to permit relative leisurely feed of pears to the bodily fixed pocket.

4. The combination with a pear treating machine including intermittently operated impaling members for respectively engaging an oriented pear and carrying it into the machine, means for feeding the pears into position to be engaged by said members comprising a plurality of banks of movable cups respectively shaped to engage and support a pear by its bulbous portion nearest the stem end, means mounting said banks of cups for horizontal reciprocation alternately from a fixed feed position to another position in vertical alignment with the impaling members, means for individually placing the pears into the cups stem end first at said fixed feed position, said pear placing means including a series of pockets into which the pears are respectively fed manually with their longitudinal axes coinciding with the longitudinal axes of the pockets, mounting means for bodily supporting said series of pockets in fixed position, each of said pockets comprising pivotally mounted retaining sections for receiving a pear and members connected therewith for pivotally moving said sections to release and drop the pear into the cup, means operatively connected to the cup reciprocating means to engage said members to open the pockets, and means connected with said members to close the pockets, the association, arrangement and timing of the described elements being such that the pockets remain closed during the major portion of the cycle of reciprocating movement of the cup banks to permit relative leisurely manual feed of pears to the bodily fixed pockets.

5. The combination with a pear treating machine including intermittently operated impaling members for respectively engaging an ori-
pear and carrying it into the machine, means for feeding the pears into position to be engaged by said members comprising a plurality of banks of movable cups respectively shaped to engage and support a pear in vertical position by its bulbous portion nearest the stem end, means mounting said banks of cups for alternate horizontal reciprocation from a fixed feed position to another position in vertical alignment beneath the impaling members, means for individually placing the pears into the cups stem end first at said fixed feed position, said pear placing means including a series of pockets into which the pears are respectively individually fed manually with their longitudinal axes coinciding with the longitudinal axes of the pockets, mounting means for bodily supporting said series of pockets in fixed position, each of said pockets comprising pivotally mounted pear retaining wall sections for receiving a pear and members connected therewith for pivotally moving said sections to release and drop the pear by gravity into the cup without disturbing the vertical position of the pear, cam actuated means operatively connected to the cup moving means to engage said members to open the pockets, gravity means connected with said members for closing the pockets, and clamping means movably mounted on said cups and having movement relative thereto for engaging and individually holding the pears in vertical position in the cups during delivery of the pears to said impaling members, the association, arrangement and timing of the described elements being such that the pockets remain closed during the major portion of the cycle of reciprocating movement of the cup banks to permit relative leisurely manual feed of pears to the bodily fixed pockets.

BURTON C. COONS.

REFERENCES CITED

The following references are of record in the file of this patent:

UNITED STATES PATENTS

| Number | Name | Date |
| --- | --- | --- |
| 1,698,476 | Frova | Jan. 8, 1929 |
| 2,187,075 | Coons | Jan. 16, 1940 |
| 1,983,892 | Barton | Dec. 11, 1934 |
| 2,160,319 | Swartz | May 30, 1939 |
| 268,442 | Nicolle | May 25, 1943 |
| 1,718,607 | Soubier | June 25, 1929 |
| 1,869,457 | Benoit | Aug. 2, 1932 |